United States Patent [19]

Frechette et al.

[11] Patent Number: 4,795,673

[45] Date of Patent: Jan. 3, 1989

[54] COMPOSITE MATERIAL OF DISCONTINUOUS SILICON CARBIDE PARTICLES AND CONTINUOUS SILICON MATRIX AND METHOD OF PRODUCING SAME

[75] Inventors: Francis J. Frechette, Tonawanda; Martin R. Kasprzyk, Buffalo; Douglas J. McDowell, Niagara Falls; Joseph S. Zanghi, Buffalo, all of N.Y.

[73] Assignee: Stemcor Corporation, Cleveland, Ohio

[21] Appl. No.: 924,174

[22] Filed: Oct. 28, 1986

Related U.S. Application Data

[63] Continuation of Ser. No. 671,800, Nov. 15, 1984, abandoned, which is a continuation of Ser. No. 169,687, Jul. 17, 1980, abandoned, Continuation-in-part of Ser. No. 093,718, Nov. 13, 1979, abandoned, which is a continuation of Ser. No. 867,860, Jan. 9, 1978, abandoned.

[51] Int. Cl.$^4$ ............................ B32B 5/16; B32B 904; C04B 33/34; C04B 33/36
[52] U.S. Cl. ............................ 428/331; 264/60; 264/62; 423/345; 428/404; 428/446; 501/88
[58] Field of Search .............. 264/60, 62; 423/345, 423/348, 434; 427/397.7; 428/331, 404, 405, 446; 501/88

[56] References Cited

U.S. PATENT DOCUMENTS

| | | | |
|---|---|---|---|
| 1,012,531 | 12/1911 | Egly | 501/88 |
| 1,030,327 | 6/1912 | Potter | 252/516 |
| 1,906,963 | 5/1933 | Heyroth | 338/330 |
| 2,242,482 | 5/1941 | Rennie | 250/27.5 |
| 2,907,972 | 10/1959 | Schildhauer et al. | 338/332 |
| 2,938,807 | 5/1960 | Andersen | 106/44 |
| 3,205,043 | 9/1965 | Taylor | 23/208 |
| 3,459,842 | 8/1969 | Wakefield | 264/56 |
| 3,495,939 | 2/1970 | Forrest | 23/208 |
| 3,998,646 | 12/1976 | Weaver | 264/29.3 X |
| 4,141,948 | 2/1979 | Laskow et al. | 264/101 |
| 4,226,914 | 10/1980 | Terner et al. | 428/446 |
| 4,240,835 | 12/1980 | Laskow et al. | 106/44 |
| 4,294,788 | 10/1981 | Laskow et al. | 264/101 |
| 4,385,434 | 5/1983 | Zehnpfennig et al. | 29/576 B |

FOREIGN PATENT DOCUMENTS

| | | | |
|---|---|---|---|
| 5632 | 11/1979 | European Pat. Off. | |
| 2011879 | 7/1979 | United Kingdom | 106/44 |

OTHER PUBLICATIONS

Kingery et al., *Introduction to Ceramics*, (2d Ed. 1976), p. 777.

*Primary Examiner*—Michael R. Lusignan
*Attorney, Agent, or Firm*—Willian Brinks Olds Hofer Gilson & Lione Ltd.

[57] ABSTRACT

Dense, strong, composite materials are produced from mixtures of silicon and silicon carbide. The composite materials are characterized by a mixture of finely-divided silicon carbide in a substantially continuous matrix of silicon. The composite materials contain from about 40 to about 60 percent by volume silicon carbide and from about 60 to about 40 percent by volume silicon. The composite materials are produced by initially producing a finely-divided silicon carbide starting component and forming the component into a green body of the desired shape. The green body is subsequently impregnated with molten silicon in the absence of any substantial amount of carbon. Suitably, a thermoplastic resin binder may be added to the silicon carbide starting material to aid in forming the green body. The impregnation step may be carried out by surrounding the green body with finely-divided silicon metal and heating the covered body to a temperature above the melting point of silicon. The composite materials described have flexural strength of over about 90,000 psi at 1100° C., elastic modulus of about 38 million psi at room temperature, are essentially non-porous and have densities ranging from about 2.6 to about 2.8 g/cc.

12 Claims, No Drawings

COMPOSITE MATERIAL OF DISCONTINUOUS SILICON CARBIDE PARTICLES AND CONTINUOUS SILICON MATRIX AND METHOD OF PRODUCING SAME

This application is a continuation of application Ser. No. 671,800, filed Nov. 15, 1984, now abandoned, which is a continuation of application Ser. No. 169,687, filed July 17, 1980 now abandoned, which is a continuation-in-part of application Ser. No. 093,718 filed Nov. 13, 1979, abandoned, which is a continuation of application Ser. No. 867,860, filed Jan. 9, 1978 abandoned.

TECHNICAL FIELD

The present invention relates to a composite material of particulate silicon carbide in a substantially continuous matrix of silicon. The present compositions are useful in fabricating articles which have high strength and high thermal shock resistance. The composite material is non-porous and relatively light in weight, having densities in the order of 2.6 to 2.8 g/cc, as compared to silicon carbide and alumina ceramic materials which have densities in the order of 3.1 to 3.7 g/cc, respectively. The composites are aptly suited to use in the fabrication of components of turbine engines, components for internal combustion engines, and turbochargers.

BACKGROUND ART

Silicon carbide, a crystalline compound of silicon and carbon, has long been known for its hardness, its strength and its excellent resistance to oxidation and corrosion. Silicon carbide has a low coefficient of expansion, good heat transfer properties and maintains high strength at elevated temperatures. In recent years, the art of producing high density silicon carbide bodies from silicon carbide powders has been developed. Methods include reaction sintering, hot pressing and pressureless sintering (initially forming the article and subsequently sintering under substantially pressureless conditions). The high density silicon carbide bodies so produced are excellent engineering materials and find utility in fabrication of components for turbines, heat exchange units, pumps, and other equipment or tools that are exposed to severe wear and/or operation under high temperature conditions.

The reaction sintering process, also called the reaction bonding process, is typically carried out by forming silicon carbide in situ by the reaction of silicon and carbon in a porous body of silicon carbide. In such processes, particulate silicon carbide is initially mixed with particulate carbon or a carbon source material. The mixture is then formed into a green body of the desired shape. Frequently, the initial mixture includes a binder, such as a thermosetting resin material, to add strength to the green body and also as a carbon source material. The green body may be baked at temperatures to set and pyrolize the binder. The shaped green body is impregnated, or infiltrated, typically by immersing the body in molten silicon at temperatures ranging from about 1400° to about 2300° C. The silicon reacts with the available carbon in the green body to form silicon carbide. Usually, the amount of carbon in the green body is less than the stoichiometric amount needed to combine with the added silicon. Thus, reaction sintered silicon carbide products typically contain from about 10 to about 25 percent by volume of free silicon.

Examples of articles of silicon and silicon carbide mixtures are described in U.S. Pat. Nos. 1,012,531; 1,030,327; 1,906,963; 2,242,482 and 3,459,842.

DISCLOSURE OF INVENTION

It has now been found that essentially non-porous, strong composite materials, having properties not possessed by prior art composite materials of similar composition, may be produced from mixtures of silicon and silicon carbide. The present composite materials are characterized by a mixture of finely divided silicon carbide in a substantially continuous matrix, or phase, of silicon. The present composite materials contain from about 40 to about 60 percent by volume silicon carbide and from about 60 to about 40 percent by volume silicon.

The silicon carbide component may suitably be selected from alpha or beta phase silicon carbide. Mixtures of alpha and beta phase material may be utilized. The silicon carbide starting material of the present invention does not require separation or purification of phases to obtain a suitable material. Minor amounts of amorphous silicon carbide may be included without deleterious effect.

The silicon carbide component is utilized in ultra finely-divided form. A suitable finely-divided material may be produced by grinding, ball milling or jet milling larger particles of silicon carbide and subsequently classifying or separating a component suited to use in the present invention. Preferably, the silicon carbide starting material has a maximum particle size of about 5 microns and an average particle size of about 0.10 to about 2.50 microns and, more preferably, less than 1.0 micron. It is difficult to obtain accurate particle size distribution for silicon carbide powders having a size less than about 1 micron in size, and, therefore, surface area may be considered relevant in determining suitable material. Accordingly, the preferred silicon carbide particles for use in the present powders have a surface area of from about 1 to about 100 $m^2/g$. Within this range, it is more preferred that the surface area of the particles range between about 2 and about 50 $m^2/g$, and, within that range, a range from about 2 to about 20 $m^2/g$ has been found eminently useful.

The silicon carbide and the silicon components may contain minor amounts of impurities, such as iron, calcium, magnesium and aluminum, without deleterious effect on the product.

The present composite materials are characterized, and may be distinguished over the prior art, by the fact that the finely-divided silicon carbide particles are distributed in a substantially continuous matrix of silicon. The prior art silicon carbide and silicon composites are typically produced by utilizing mixtures of various sized silicon carbide particles to obtain a "packing mixture". The mixture is then pressed to obtain a porous green body of the desired shape, and subsequently the porous body is impregnated with molten silicon. The result is composite material which is essentially non-porous (i.e., containing less than 0.1% voids) containing a substantially continuous phase of silicon carbide impregnated with a substantially discontinuous phase of silicon.

It is postulated that the present composite materials are obtained by the utilization of a starting material of very finely-divided silicon carbide, preferably of submicron size, and are produced by the silicon phase wetting and substantially surrounding each individual silicon carbide particle.

The present binary composite materials are produced by initially producing a finely-divided silicon carbide and forming the silicon carbide component into a green body of the desired shape. The forming or shaping process is suitably carried out using known techniques, for example, by injection molding, compressing molding, slip casting, blow molding, vacuum forming or by extrusion. The shaped green body is is subsequently impregnated with silicon. The impregnation step takes place in the absence of any substantial amount of carbon. A binder may be added to the silicon carbide starting material. Usually, amounts between about 1.0 and 25.0 percent by weight are employed, the amount of temporary binder varying widely, depending on the forming method used. Thermoplastic resins, such as polystyrene, polyethylene or acrylic resins are particularly useful as binders. Such thermoplastic resin materials decompose at temperatures well below the temperature of the impregnation step and leave no carbon residue.

The impregnation step may be carried out by simply covering the porous green body with powdered silicon metal and heating, allowing impregnation to occur by capillary action, or alternatively, may be carried out by immersion or vapor infiltration techniques. However, in the preferred embodiment, the porous green body is surrounded with powdered silicon metal, placed in a vacuum furnace, and, while under vacuum, heated to above the melting point of silicon. Usually, partial vacuums (between about 0.01 and about 0.5 mmHg absolute pressure) are suitably employed. Silicon melts at about 1410° C. However, temperatures up to about 2300° C., or the vaporization point of silicon may be employed. Particularly useful are temperatures between about 1500° and 2000° C.

The composite materials produced by the present compositions have physical properties which are highly desirable in ceramic materials. The composites have flexural strengths of over 90,000 psi at 1100° C., a characteristic useful in the fabrication of engine components used or operated at elevated temperatures. The composites have an elastic modulus of 38 million psi or less at room temperature, a characteristic useful in providing the composites with a high resistance to thermal shock and thermal stresses. The composites have densities between about 2.6 and about 2.8 g/cc, as compared to 3.15 g/cc for pure sintered silicon carbide, a characteristic useful in the fabrication of armors, turbine blades, rotors and components for valve trains where strength and low weight are advantageously employed. The composites exhibit a plastic deformation at high temperatures, a characteristic allowing them to be less sensitive to small flaws than other ceramic materials which are brittle at high temperatures. The present composites exhibit no measurable shrinkage from the green body dimensions through the impregnation step, facilitating the molding of intricate shaped green bodies and recovering a hardened composite of the same shape and dimensions.

BEST MODE FOR CARRYING OUT THE INVENTION

The invention will now be described in greater detail partly with reference to the following examples, which are intended to illustrate, and not to limit the scope of the invention. In the following examples, all parts are parts by weight, and all temperatures are in degrees Centigrade.

EXAMPLES I–III—PRIOR ART

Example I 100 parts of particulate silicon carbide having an average particle size of 5.2 microns, ranging between about 2.0 and about 10.0 microns, was mixed with 20.0 parts of polyphenylene resin binder dissolved in acetone, in a paddle blender for four hours. After drying, the mixture was hammer milled and screened through a 106 micron screen. The mixture was then warm compression molded into 15 bars about 5 cm in length, 3 mm in thickness and 6 mm in width, using a metal mold at a pressure of about 280 kg/cm$^2$. The bars were then placed in an oven and heated to a temperature of 1000° C. to pyrolize the resin binder. The bars were next surrounded with a mixture of powdered silicon metal mixed with minor amounts of carbon and phenolic resin. The carbon and phenolic resin in the cover mixture do not enter into the impregnation reaction. They are utilized to make the cover residue more friable and to facilitate its removal after the heating step. The bars and surrounding cover mixture were then placed in a vacuum furnace and the chamber was evacuated to a pressure of about $10^{-2}$ mmHg absolute. The furnace temperature was raised to about 1700° C., well above the melting point of silicon. At this temperature, the pyrolized carbon in the bars underwent a reaction with the infiltrating molten silicon to form reaction bonded silicon carbide. The bars were then removed from the furnace, cooled, cleaned of residue and weighed. The average density of the impregnated bars was found to be 2.98 g/cc, ranging from 2.95 g/cc to 2.99 g/cc. When tested on a MIS testing machine, the bars were found to have an average flexural strength of 66,500 pounds per square inch (reported for convenience as 66.5 ksi), ranging from 59.8 to 69.6 ksi, at 1100° C., using a four point bending fixture. The bars were found to have an elastic modulus of 48×10$^6$ psi when measured on a sonic modulus tester at room temperature. After the heating step, the bars were found to have a linear shrinkage between 0.5 and 2.0 percent, with an average of 1.1 percent. The product was found to contain 26 percent by volume silicon with the silicon carbide component having an average grain size of 5.2 microns, ranging between about 2.0 and 15.0 microns. The bars, and those in Examples II and III, ruptured during the flexural strength test. This example is shown in Table A below as Example I.

Example II

Example II was prepared using the same procedure, equipment and techniques as described in Example I except that the starting and resulting final densities and volume percent silicon were varied. The results are shown in Table A.

Example III

Example III is a dry cast system in which particulate silicon carbide having an average particle size of 100.0 microns, ranging from 70.0 to 140.0 microns, was mixed with a phenolic resin in acetone, dried, and cast into a metal mold in the absence of measurable pressure. After casting, the formed body was cured in the metal mold to set the resin. Subsequent processing utilized the same procedures, equipment and techniques as described in Examples I and II above. The results are shown in Table A.

EXAMPLE IV-V—THE INVENTION

Example IV 78.5 parts of silicon carbide having an average particle size of 0.70 microns, ranging from about 0.1 and about 5.0 microns, were mixed with 21.5 parts of polystyrene resin in a heated sigma blade mixer and the mixture was injection molded into bars of the same size as in Example I. The bars were then placed in a ceramic box and baked slowly to 800° C. to remove the resin. They were then covered with a mixture of silicon metal, carbon and a phenolic resin as in Example I and heated in a vacuum furnace using the same procedure, equipment and techniques as described in Example I. After cooling, the bars were removed from the furnace and cleaned of residue. The 11 bars were tested as in Example I and were found to have an average density of 2.79 g/cc, ranging from 2.75 to 2.80 g/cc. When tested on a MIS testing machine, the bars were found to have an average flexural strength of 91.0 ksi, ranging from 65.0 to 135.0 ksi, at 1100° C., using a four point bending fixture. The bars were found to have an elastic modulus of $38 \times 10^6$ psi when tested on a sonic modulus machine at room temperature. After the heating step, the bars were found to have sustained substantially no shrinkage. The product was found to contain 58 percent by volume silicon with the silicon carbide component having an average grain size of 0.70 microns, ranging from 0.1 to 5.0 microns. The bars, and also the bars in Example V, were found to deform in the flexural strength test at 1100° C., with no visible signs of cracking. This example is shown in Table A below as Example IV.

Example V

Example V was prepared using the same procedures, equipment and techniques as described in Example IV, except that the starting and final densities were varied. The results are also shown in Table A.

It will be appreciated that the present invention is not to be construed as limited to the specific examples and embodiments given in the foregoing and that various modifications may be made within the ordinary skill of the art without departing from the spirit and scope of the invention.

(a) mixing from about 75 to about 99 percent by weight of silicon carbide particles with from about 1 to about 25 percent by weight of thermoplastic temporary binder;
(b) forming the silicon carbide particles and thermoplastic temporary binder into a desired shape; and
(c) impregnating the shape with from about 40 to about 60 percent by volume of free silicon, in the absence of any substantial amount of carbon and without in situ formation of silicon carbide.

2. A silicon/silicon carbide composite body according to claim 1, having a flexural strength of at least 60,000 pounds per square inch at 1100° C.

3. A silicon/silicon carbide composite body according to claim 2, having a flexural strength of at least 90,000 pounds per square inch at 1100° C.

4. In a composite body containing from about 40 to about 60% by volume silicon carbide and from about 40 to about 60% by volume silicon,
the improvement which comprises the body consisting essentially of discontinuous particles of silicon carbide in a substantially continuous matrix of silicon; and having an elastic modulus of 38,000,000 or less pounds per square inch at room temperature and having been formed by a process comprising
(a) mixing from about 75 to about 99 percent by weight of silicon carbide particles with from about 1 to about 25 percent by weight of thermoplastic temporary binder;
(b) forming the silicon carbide particles and thermoplastic temporary binder into a desired shape; and
(c) impregnating the shape with from about 40 to about 60 percent by volume of free silicon, in the absence of any substantial amount of carbon and without in situ formation of silicon carbide.

5. A silicon/silicon carbide composite body according to claim 4, having a flexural strength of at least 60,000 pounds per square inch at 1100° C.

6. A silicon/silicon carbide composite body according to claim 5, having a flexural strength of at least 90,000 pounds per square inch at 1100° C.

7. A process for making a silicon/silicon carbide composite body, comprising
(a) mixing from about 75 to about 99 percent by weight of silicon carbide particles having a maximum size of less than 5 microns and an average size

| Example | 1100° C. Flexural Strength (ksi) | | | Elastic Modulus ($\times 10^6$ psi) | Density (g/cc) | | | % Linear Shrinkage | | | SiC Grain Size (Microns) | | | Volume % Silicon | Sample Quantity |
|---|---|---|---|---|---|---|---|---|---|---|---|---|---|---|---|
| | Low | Avg. | High | | Low | Avg. | High | Low | Avg. | High | Low | Avg. | High | | |
| I | 59.8 | 66.5 | 69.6 | 46 | 2.95 | 2.98 | 2.99 | 0.5 | 1.1 | 2.0 | 2.0 | 5.2 | 15.0 | 26 | 15 |
| II | 53.4 | 74.0 | 100.9 | 46 | 2.82 | 2.84 | 2.87 | 0.5 | 1.1 | 2.0 | 2.0 | 5.2 | 15.0 | 42 | 15 |
| III | 12.6 | 16.4 | 18.1 | 46 | 2.69 | 2.75 | 2.85 | 0.5 | 1.1 | 2.0 | 70.0 | 100.0 | 140.0 | 52 | 15 |
| IV | 84.3 | 91.0 | 106.0 | 38 | 2.75 | 2.79 | 2.80 | 0 | | | 0.1 | 0.7 | 5.0 | 58 | 11 |
| V | 65.2 | 96.0 | 135.4 | 38 | 2.66 | 2.74 | 2.76 | 0 | | | 0.1 | 0.7 | 5.0 | 58 | 15 |

We claim:

1. A deformable silicon/silicon carbide composite body consisting essentially of from about 40 to 60 percent by volume discontinuous particles of silicon carbide in a substantially continuous matrix of silicon, the discontinuous particles of silicon carbide having a maximum size of less than 5 microns and an average size between about 0.10 and about 2.50 microns; said body having an elastic modulus of 38,000,000 or less pounds per square inch at room temperature and having been formed by a process comprising between about 0.1 and about 2.5 microns, and from about 1 to about 25 percent by weight of a thermoplastic temporary binder;
(b) forming the silicon carbide particles and thermoplastic resin temporary binder into a desired shape; and
(c) impregnating the shape of silicon carbide particles and thermoplastic resin temporary binder with a sufficient amount of free silicon, in the absence of any substantial amount of carbon and without in situ formation of silicon carbide, to provide a body consisting essentially of from about 40 to about 60% by volume silicon carbide and from about 40 to about 60% by volume silicon.

8. A process according to claim 7, comprising an additional step of heating the shape of silicon carbide particles and thermoplastic resin temporary binder, prior to the silicon impregnation step, to remove the thermoplastic resin temporary binder.

9. A process according to claim 8, wherein the step of impregnating the shape of silicon carbide particles and thermoplastic resin temporary binder with free silicon is accomplished by (i) covering the shape of silicon carbide particles and thermoplastic resin temporary binder with powdered silicon metal, and
(ii) heating the covered shape to a temperature between about 1410° C. to about 2300° C.

10. A process according to claim 9, wherein the heating is at a temperature between about 1500° C. and about 2000° C.

11. A process according to claim 9, wherein the heating is conducted under an absolute pressure of between about 0.01 and about 0.5 mmHg absolute pressure.

12. A process according to claim 10, wherein the heating is conducted under an absolute pressure of between about 0.01 and about 0.5 mmHg absolute pressure.

* * * * *

UNITED STATES PATENT AND TRADEMARK OFFICE
CERTIFICATE OF CORRECTION

PATENT NO. : 4,795,673
DATED : December 27, 1988
INVENTOR(S) : Francis J. Frechette et al.

It is certified that error appears in the above-identified patent and that said Letters Patent is hereby corrected as shown below:

In column 1, line 10, after "1980" please insert --,--; in line 11, after "093,718" insert --,--; and in line 13, after "1978" insert --,--.

In column 1, line 26, before "turbine" please delete "of" and substitute therefor --for--.

In column 3, line 10, please delete the second occurrence of "is".

Signed and Sealed this

Ninth Day of March, 1993

*Attest:*

STEPHEN G. KUNIN

*Attesting Officer*　　　*Acting Commissioner of Patents and Trademarks*